US005739244A

United States Patent [19]
Fisk

[11] Patent Number: 5,739,244
[45] Date of Patent: Apr. 14, 1998

[54] POLYMER COMPOSITION CONTAINING PRIME STARCH

[76] Inventor: Donald Fisk, 875 E. Linn St., Canton, Ill. 61520

[21] Appl. No.: 607,344

[22] Filed: Feb. 26, 1996

Related U.S. Application Data

[63] Continuation-in-part of Ser. No. 267,193, Jun. 29, 1994, Pat. No. 5,523,372, and Ser. No. 514,449, Aug. 11, 1995, which is a continuation of Ser. No. 216,414, Mar. 23, 1994, abandoned.

[51] Int. Cl.⁶ .............................. C08L 3/00; C08L 89/00
[52] U.S. Cl. ........................... 524/47; 524/52; 524/53
[58] Field of Search ........................ 524/47, 52, 53

[56] References Cited

U.S. PATENT DOCUMENTS

| 5,480,923 | 1/1996 | Schmid et al. | 524/47 |
| 5,500,465 | 3/1996 | Krishnan et al. | 524/47 |

FOREIGN PATENT DOCUMENTS

WO 19680  5/1992  WIPO.

*Primary Examiner*—Nathan M. Nutter
*Attorney, Agent, or Firm*—Bierman, Muserlian and Lucas

[57] ABSTRACT

Prime starch is used in an extruder or injection molding machine to form a shaped article. The prime starch reduces the mechanical energy needed to form the shaped article compared to conventional dried starch. Examples of the resulting shaped article are a foamed sheet, foamed peanut or a container. The shaped article is biodegradable.

10 Claims, No Drawings

POLYMER COMPOSITION CONTAINING PRIME STARCH

CROSS-REFERENCE TO RELATED APPLICATIONS

This is a continuation-in-part of U.S. patent application Ser. No. 08/267,193 filed Jun. 29, 1994 now U.S. Pat. No. 5,523,372 issued Jun. 4, 1996; and U.S. patent application Ser. No. 08/514,449 filed Aug. 11, 1995 which in turn was a continuation of U.S. patent application Ser. No. 08/216,414 filed Mar. 23, 1994, now abandoned.

FIELD OF THE INVENTION

This invention relates to polymer compositions which are used in extrusion and injection molding machines to form shaped articles. More specifically, the present invention relates to the use of prime starch in a polymer composition which is formed into a shaped article in extrusion and injection molding machines. The resulting shaped article has improved properties when compared to shaped articles made polymer compositions employing conventional starch.

BACKGROUND OF THE INVENTION

Prime starch is starch extracted from a starch bearing plant through a wet milling process before the starch has been subjected to a drying process. In a conventional corn wet milling operation, corn kernels are added to water and subjected to a multi-stare process to separate the starch from the gluten, oil and hull. The resulting starch is in an aqueous slurry which is conventionally subjected to a dewatering step and a drying step. The dewatering step is typically a pressure and/or vacuum process while the drying step typically a hot air process. The term "prime starch" as used in the specification and claims means starch prior to the drying step. The prime starch can be either dewatered or in slurry form. Dewatered prime starch is conventionally referred to as starch cake. Prime starch in either the cake or slurry form is generally not available commercially.

The use of starch in polymer compositions to make shaped articles is old, however, it has recently come into the spotlight due to its biodegradable nature. With mounting pressure on manufacturers to produce biodegradable products, more and more manufacturers are seeking alternative sources for conventional synthetic polymers. Natural polymers such as cellulose and starch have been the main contenders as replacements for the synthetic polymers.

Molding and/or extrusion of plastic materials is a conventional process wherein a solid plastic material is softened under heat and pressure to a molten state and then shaped while in the molten state. The shaped product is then hardened by cooling. For example, injection molding typically employs a single screw extruder to soften the plastic material and force the softened plastic material into a mold wherein it hardens.

SUMMARY OF THE INVENTION

It has now been discovered that a shaped article made from a prime starch has greater ductility and flexibility than a shaped article made from a conventional dried starch. It has also been found that less energy is needed to extrude a prime starch than a conventional dried starch. These attributes of a shaped article made from a prime starch are obtained without the loss of biodegradability, i.e. a shaped article made from a prime starch has comparable biodegradability to a shaped article made from a conventional dried starch. Furthermore, prime starch produces a molded product with a more uniform product composition than a molded product made from conventional dried starch.

It is not completely understood why prime starch produces a molded product with physical attributes which are markedly different from conventional dried starch. It is speculated that, during drying, closely associated regions are formed within the starch granule and that these regions do not become fully disassociated upon rehydration. These associated regions in the starch granule may cause an obstruction which has a deleterious effect on extrusion and/or molding when compared to conventional dried starch. Whatever the reason, the physical differences between the two starches are real and measurable.

DETAILED DESCRIPTION OF THE INVENTION

In order to make a shaped article in accordance with the present invention, a polymer composition comprising prime starch is employed in a conventional extruder and/or injection molding machine. The extruder and/or injection molding machine is operated in a conventional manner so as to form a fluid polymer composition.

The polymer composition of the present invention comprises at least about 50% by weight prime starch and, more preferably, at least about 70% by weight prime starch. Good results have been obtained when the polymeric composition comprises about 80 to about 100% by weight prime starch.

In order to make a shaped article in accordance with the present invention, the moisture level of the prime starch cannot be below about 13.5% by weight and, preferably, is not below about 15% by weight. The moisture level of the prime starch used to make the shaped article in accordance with the present invention is more preferably about 20% by weight and above. The preferred upper limit for the moisture level is about 35%. Moisture is measured in a conventional manner.

Any source of prime starch can be employed in the present invention. Suitable sources include maize (corn), sorghum, wheat, potato, barley, tapioca and rice. The preferred sources are maize and wheat. The starch can be of any variety, common, waxy or high amylose.

The prime starch used in the present invention can be either in slurry form or dewatered cake form. Furthermore, the prime starch used in the present invention can be unmodified prime starch, i.e. granular starch, chemically modified prime starch, a starch graft copolymer made from prime starch or a combination thereof. Good results have been obtained with starch graft copolymers.

Starch graft copolymers are made by grafting a monomer onto the granular starch. Suitable monomers for use in the present invention include styrene, methyl methacrylate, methyl acrylate, butyl acrylate, butadiene, isoprene, and combinations thereof. Preferably, methyl acrylate, butyl acrylate and blends of methyl acrylate and butyl acrylate are used as the monomers.

Many methods are known for the initiation of graft polymerization, e.g., ceric ion, cobalt-60 irradiation, electron beam irradiation, ozone, ferrous ion-peroxide, or other redox systems. Any of these known methods will yield the composite compositions of the instant invention. Good results have been obtained with a ceric ion as the initiator.

When using a ceric ion as an initiator, it has been found that ceric ammonium nitrate is a good source of ceric ion. The ceric ammonium nitrate can be added either in one step or proportionally over a period of time by means of a solution of nitric acid wherein the ceric ammonium nitrate has been dissolved.

The grafting reaction is conducted in a conventional manner using conventional equipment to produce a starch graft copolymer for use in the present invention. A suitable method for making the starch graft copolymer for use in the present invention is to form an aqueous slurry of the granular prime starch to a Baume of about 2 to 30, preferably about 20 Be. The water used to make the slurry is distilled or deionized. In order to remove dissolved oxygen, a nitrogen purge is used for about 30 minutes. Alternatively, some other method, such as a vacuum, is used to remove the oxygen from the water.

During the oxygen removal step, the slurry is heated to about 15° C. to about 55° C. and, more preferably, about 25° C. to about 45° C. The temperature of the slurry throughout the reaction is maintained below the gelatinization temperature of the starch and, generally, below about 60° C.

Next, the monomer is added to the deoxygenated slurry. The purge/vacuum no longer needs to be maintained; however, oxygen should not be introduced into the reaction vessel. The monomer is stirred into the slurry so as to uniformly distribute it throughout the slurry. The amount of monomer added is calculated in a conventional manner so as to provide an add-on level in accordance with the present invention. The add-on level is about 3% to about 90% by weight and, preferably, about 20% to about 60% by weight.

The term "add-on level" as used in the specification and claims means the amount by weight of synthetic monomer present in the copolymer based on the total weight of the copolymer.

The pH of the slurry is adjusted to under 2.0 to obtain the maximum grafting efficiency. Good results have been obtained by using nitric acid. The pH adjustment can be done at any time prior to the addition of the initiator. Preferably, the pH of the water is adjusted to below 2.0 prior to the addition of the starch to the water.

Next, an initiator of ceric ammonium nitrate is added in a 1N nitric acid solution over a period of about ½ hour. Good results have been obtained with using a ratio of about one mole of ceric ammonium nitrate to about 50 to about 250 anhydroglucose units (AGU) of starch.

The reaction is allowed to proceed for a period of time to obtain the add-on level of polymer in accordance with the present invention.

Finally, the reaction mixture is neutralized and dewatered and the resulting starch graft copolymer is dried.

In order to increase the grafting efficiency, the monomer is added after the addition of the initiator rather than before. By adding the monomer after the initiator, the grafting efficiency can be increased by as much as about 20%. When adding the monomer after the initiator, there is a limited amount of time from when the initiator is added to when the monomer has to be added. The initiator, and especially ceric ammonium nitrate, is a strong oxidizer and in the acid environment will soon start to break down the starch. The maximum length of time between addition of the initiator and the monomer will vary and can readily be determined by one of skill in the art.

It has been found that the reaction between the prime starch and the monomer can take place in the barrel of an extruder. The preferable extruder type is a co-rotating twin screw extruder with heating/cooling of each zone separately controlled. Sufficient barrel ratio (L/D) is necessary to promote polymerization in the extruder barrel. Starch cake as it is taken from a dewatering step at a starch wet milling plant, is fed into the extruder and is immediately subjected to a vacuum while being mixed in the extruder to remove the oxygen. The initiator in dilute acid is added, mixed briefly but intensively and then the monomer is added and also mixed briefly and intensively. The material is transported down stream in the extruder and at the end of the barrel, a vacuum is used to pull off any unreacted monomer and surplus water vapor. These gases are passed through a scrubber and the monomer reused and the condensed water, being pure, is used to dilute the acid/initiator mix. This water can also serve to help control reaction temperature by controlling water content of the mix. Next the neutralizer is added and intensively mixed and the grafted finished product is expelled from the extruder, sized, and dried. This system cuts costs by reducing steps in the grafting procedure, eliminates the expensive disposition of effluents, reduces potential contaminants from wet milling slurry water and, comparatively, is much safer for the operators.

It has been found that a lower temperature must be employed to dry a starch graft copolymer made from a prime starch. Too high a temperature will cause the starch graft copolymer to gelatinize. Preferably, the drying temperature is about 35° C. to about 40° C.

Using prime starch decreases the amount of water added into the process and shortens the degassing step. In the case of a slurry, the use of additional water can be completely eliminated. Filtration of the grafted prime starch product reveals that the product dries into a coarser powder than conventional dried or modified corn starch products after sifting. A different material behavior has been noticed in several processing steps utilizing the prime starch as compared to conventional dried starch: (a) a smoother, more uniform slurry with much less free water is obtained; (b) the filtration requires more pressure to reduce the moisture content; (c) the material tends to gelatinize at a lower temperature while being dried; and (d) compounding formulations require less extruder torque. Additionally, it is believed that the grafted material made with prime starch is a more uniformly grafted material than grafted material made with conventional dried starch. Specifically, it has been found that the grafted material made with prime starch does not stick to the walls of the reaction vessel or the impeller of the reaction vessel as much as the grafted material made with dried starch. These characteristics mean that the starch graft copolymer of the present invention is easier, and thus less costly, to process than a starch graft copolymer made with dried starch.

It has also been found that the starch graft copolymer made with prime starch will convert more easily to a more cohesive molten state. In rare instances, hard-to-remove parts in the mold cavity would break away from the rest of the part and remain in the mold cavity. It has been discovered that the next shot (subsequent filling of the cavity with molten material) results in the remaining portion from the previous cycle adhering to the new shot and, consequently, the entire part is ejected from the mold. In all instances where a starch graft copolymer of conventional dried starch was utilized in the same formulation, and extruded into this same mold, this phenomenon did not occur.

Modified prime starches for use in the polymer composition include crosslinked prime starch, etherified prime starch and esterified prime starch. Conventionally, such starches are referred to as chemically modified prime starch.

In order to etherify the starch of the present invention, a slurry of prime starch is made up having about 5 to about 40% by weight starch. The pH of the slurry is adjusted to about 10 to about 12 preferably with sodium hydroxide. Next, an etherification agent such as ethylene oxide or propylene oxide is added to the slurry in an amount of about ½ to about 25% depending on the desired degree of substitution. The reaction conditions are held for about 5 to about 30 hours at about 70° to about 120° F. The slurry is then neutralized with any known acid, dewatered, and washed. The preferred etherified prime starches are hydroxypropylated common corn starch, hydroxypropylated high amylose corn starch, and hydroxypropylated wheat starch.

In order to crosslink the starch of the present invention, a slurry of starch is made up of about 5 to about 40% by weight starch. The pH of the slurry is adjusted to about 8 to about 12 preferably with sodium hydroxide. Optionally, a salt may be added to the slurry to affect swelling of the granules. Then the slurry is reacted with a crosslinking agent such as phosphorous oxychloride, trimetaphosphate salt, or epichlorohydrin at about 70° to about 120° for about ½ to about 5 hours. The length of time of the reaction will depend on the amount of crosslinking agent used and the specific crosslinking agent chosen.

In order to esterify the starch of the present invention, a slurry of starch is prepared having about 5 to about 40% by weight starch. The pH of the slurry is then adjusted to about 8 to about 10 and an esterification agent is added to the slurry such as vinyl ester, acetyl halides, acid anhydrides like acetic anhydride, or succinic anhydride. The esterification agent is added slowly while maintaining the pH of the slurry. The reaction is continued for about ½ to about 5 hours at about 80 to about 120° F. Once the reaction is completed to the desired degree of substitution, the slurry is neutralized, dewatered, and washed. The preferred esterified prime starches are acetylated common corn starch, acetylated high amylose corn starch, and acetylated wheat starch.

Unmodified prime starch is simply granular prime starch as extracted from the plant source.

In addition to prime starch, the polymer composition used in the present invention may contain a polymer selected from the group consisting of a synthetic polymer, a conventionally dried starch product, a cellulose product and a combination thereof. This other polymer may be any conventional polymer used in extrusion or injection molding to form a shaped article. The preferred other polymer is a synthetic polymer.

Suitable synthetic polymers include polyethylene, polypropylene, polyvinyl alcohol, polyvinyl acetate, polystyrene, and copolymers such as ethylene vinyl acetate (EVA), ethylene vinyl alcohol (EVAL), and ethylene acrylic acid (EAA).

Suitable conventionally dried starch products include granular starch; chemically modified starch, such as esterified starch like acetylated starches, etherified starch like hydroxypropylated starches, and crosslinked starch; starch graft copolymers made from conventionally dried starch; flour, especially wheat flour.

Suitable cellulose products include cellulose, methyl cellulose, hydroxypropyl cellulose, hydroxymethyl cellulose, and hydroxyethyl cellulose.

The amount of other polymer in the polymer composition of the present invention is about 50% by weight or less. More preferably, the amount of other polymer is about 30% or less and, most preferred, is when the other polymer is present in an amount of about 0 to about 20% by weight.

Processing aids can be used with the polymer composition of the present invention to assist in the extrusion and injection molding of the shaped article. These processing aids are often themselves polymers. Suitable processing aids include plasticizers such as polyethylene, glycol, glycerol, sorbitol, dioctyl-sodium sulfosuccinate, triethyl citrate, tributyl citrate, 1,2-propyleneglycol; and lubricants such as glycerides, wax, phospholipids and stearates.

The amount of process aid included with the polymer composition is about 0 to about 10% by weight of composition.

Coloring agents may also be added if color is a factor. A blowing agent can also be used if the resulting shaped article is a foamed product.

Shaped articles which can be made from the present invention include films, bottles, plates, containers of various sizes and shapes, foamed sheets, foamed peanuts and the like.

The extrusion and injection molding of the polymer composition of the present invention is done in a conventional manner using conventional equipment. The prime starch is compounded in a conventional manner using conventional equipment. In one example, a prime starch at a moisture content of about 20% was compounded using a twin screw extruder wherein the barrel was at a temperature of 200° F. (95° C.) and had a length to diameter ratio of 14:1. The extruder was operated at 30 rpm. The prime starch was compounded with about 6 parts of plasticizer and about 0.5 parts of an internal lubricant based on 100 parts by weight prime starch. Compounding of plastic materials is a conventional step in which various additives are combined with the polymeric material so as to form a uniform material suitable for injection molding or other processing by extrusion or other conventional means.

Pellets were produced at the outlet or nozzle of the twin screw extruder and air dried down to about 5% moisture. These pellets are the feed stock to the extruder/injection molding machine. The pellets can be passed through the compound extruder again if they are not uniform.

In order to injection mold the pellets, conventional equipment is used in a conventional manner. In this instance, the injection molding machine had an extrusion barrel operated at 150 rpm at 160° C. with a length to diameter ratio of 24:1. There was a lapse of about 30 seconds between shots to the mold. The mold itself was a single cavity mold. The shaped article formed by the cavity was a cereal bowl. Each shot had a residence time in the barrel of about 1 to 2 minutes.

It was noted that the shaped article made from the extruder with a polymer composition comprising prime starch had a smooth homogeneous interior typical of synthetic polymers rather than the non-uniform interior which is typical of extruded products made from starch graft copolymers of conventional dried starch.

Bottles and films can be made using prime starch in accordance with the present invention and film blowing and blow molding extrusion processes. The film blowing and blow molding extrusion processes are operated in a conventional manner using conventional equipment with the plastic composition of the present invention.

These and other aspects of the present invention may be more fully understood by reference to the following examples.

EXAMPLE 1

This example illustrates making a starch graft copolymer from a prime starch in slurry form.

Using a conventional common corn starch slurry as obtained from a wet milling operation prior to dewatering and drying, the solids content of the slurry was adjusted to 20% and the pH of the slurry was adjusted to 2–3 with dilute (1N) nitric acid. The slurry contained 45 pounds of dry starch. The slurry was subjected to a vacuum for 10 minutes to remove oxygen and then the temperature was maintained at 80° F. (27° C.). Next, 36.8 pounds of monomer was added to the slurry. The monomer added was methyl acrylate. Then the initiator, ceric ammonium nitrate, in a 1N nitric acid solution was added at a level of one mole of ceric ammonium nitrate to 100 AGU. The initiator was added over 5 minutes. After a period of about 30 to 40 minutes, sodium hydroxide was added to the system to adjust the pH to neutral. Finally, the reaction product was dewatered and dried.

EXAMPLE 2

This example illustrates the reduced temperature and torque necessary for a starch graft copolymer made from prime starch compared to a starch graft copolymer made with conventional dried corn starch.

A starch graft copolymer made from prime common corn starch in accordance with Example 1 was compared to a starch graft copolymer made from conventional dried common corn starch. The results of this test are listed below:

|  | Prime 50:50 | Dried 50:50 | Prime 59:41 | Dried 59:41 |
| --- | --- | --- | --- | --- |
| Moisture (%) | 10.2 | 10.2 | 16 | 18 |
| Torque (M-g) | 5464.6 | 8174 | 4287.2 | 5455 |
| Pressure (psi) | 5576.6 | 6877.5 | 4527.7 | 5049.8 |

The add-on levels are listed at the top of the column ratio of the weight percent of starch to synthetic polymer in the grafted material.

These materials were extruded at a moisture level of 5–6%. The extruder had a barrel length to diameter ratio of 11:1 and used a twin screw extruder operated at 30 rpm. The temperature along the length of the barrel was 190° F. (88° C.) at entry, 210° F. (99° C.), 220° F. (104° C.) and 230° F. (110° C.) at exit.

EXAMPLE 3

This example compares various physical attributes of a starch graft copolymer made from prime starch with a starch graft copolymer made with conventional dried starch.

Starch graft copolymers made from prime starch and a methyl acrylate monomer were prepared in accordance with Example 1 above to produce add-on levels of 41%, 50% and 59%.

Three starch graft copolymers made from conventional, dried starch and methyl acrylate were prepared using the procedure in Example 1 above and having add-on levels of 41%, 50% and 59%.

Each of the starch graft copolymers were tested for Young's modulus, tensile strength, elongation and tear resistance. The test results are given below:

|  | Young's Modulus | Tensile Strength (MPa) | Elongation (%) | Tear Strength (N/mm) |
| --- | --- | --- | --- | --- |
| Prime Starch |  |  |  |  |
| 41% | 212.8 | 11.05 | 54.75 | 2.030 |
| 50% | 189.6 | 10.84 | 62.54 | 3.833 |
| 59% | 191.8 | 10.82 | 69.25 | 4.289 |
| Conventional Dried Starch |  |  |  |  |
| 41% | 356.7 | 14.08 | 15.85 | 1.719 |
| 50% | 235.4 | 15.03 | 51.33 | 3.591 |
| 59% | 270.5 | 13.33 | 28.56 | 3.242 |

The flexibility or brittleness was determined by Young's Modulus test.

The tensile strength was determined by using two inch gauge length samples with a 50 mm/min. crosshead speed.

The elongation was determined by the Trouser test, again on a two inch gauge length. The Young's Modulus test, Trouser test, and tensile strength test were done in a conventional manner using conventional equipment.

The samples of both the prime starch graft copolymer and the conventional dried starch graft copolymer were prepared by extruding the copolymers in a single screw extruder under the following conditions: the moisture levels were at 16% for the 41% add-on formulation, 10% for the 50% add-on formulation, and 16% for the 59% add-on formulation; the barrel length to diameter ratio was 20:1; the entry temperature was 88° C.; the exit temperature was 106° C.; and the speed was at 30 rpm. For the 50% add-on level, a ribbon measuring about 1"×4" was used for the test. For the 59% add-on level, a ribbon measuring about 1.1"×4" was used; and for the 41% add-on level, the ribbon measured 1.6"×4".

As can be seen, the ductility and tear strength of the prime starch graft copolymer was superior to that of the conventional dried starch graft copolymer.

This example also illustrates that a prime starch graft copolymer with a higher percentage of starch, i.e. a lower add-on level, has the same physical properties as a conventional dried starch graft copolymer with less starch, i.e. with a higher add-on level. This means that using prime starch produces a product which is more biodegradable than the starch graft copolymer made from conventional dried starch.

As can be seen from the above data, the starch graft copolymer made with conventional dried starch at 50% and 59% starch levels had a dramatic decrease in properties when compared with starch graft copolymer made with identical starch levels of prime starch. In fact, an increase in tear strength was observed in the higher starch level (59%) graft copolymer ribbon made with prime starch, while the opposite is true with the dried starch material.

EXAMPLE 4

This example illustrates the melt flow index of a starch graft copolymer made from prime starch as compared to a starch graft copolymer made from conventional dried starch.

In accordance with Example 1 above, a prime starch graft copolymer was made with a methyl acrylate monomer to an add-on level of 45%. The melt flow of these materials as well as a conventional polyethylene were as follows:

|  | Melt Flow |
| --- | --- |
| Polyethylene Index Rating of 100 | 12 inches |
| Prime Starch Graft Copolymer | 13 inches |
| Conventional Dried Starch Graft Copolymer | 11 inches |

The melt flow index was measured by injection molded spiral melt flow test.

This data evidences the fact that the starch graft copolymer made from prime starch has flow characteristics comparable to conventional synthetic polymers.

Reference has been made throughout the specification to obtaining prime starch through a wet milling operation because wet milling is used in most, if not all, commercial establishments to extract the starch granules from the plant. There are dry milling operations. For example, corn may be dry milled using screening and air classification based on particle size, but this process does not completely separate oil, protein, starch and hull. Wet milling operations are considered to better separate the various components from each other. It should be appreciated that prime starch can be obtained through a dry milling operation so long as it does not dry the starch granule below the moisture level of about 13.5% by weight and, more preferably, not below about 15% by weight.

It will be understood that the claims are intended to cover all changes and modifications of the preferred embodiments of the invention herein chosen for the purpose of illustration which do not constitute a departure from the spirit and scope of the invention.

I claim:

1. In a process for making shaped articles by extrusion or injection molding from a polymer composition comprising starch, the improvement comprising replacing the starch in the polymer composition with a prime starch.

2. The process of claim 1 wherein the prime starch is a starch graft copolymer made from prime starch, a chemically modified prime starch or a granular prime starch.

3. The process of claim 1 or 2 wherein the polymer composition comprises at least about 50% by weight prime starch and less than about 50% by weight of another polymer selected from the group consisting of synthetic polymers, conventional starch product, and cellulose product.

4. A process for preparing a shaped article by extrusion or injection molding comprising heating a polymer composition comprising a prime starch to fluidize the polymer composition, and forming a shaped article from said fluidized polymer composition.

5. The process of claim 4 wherein the prime starch is a starch graft copolymer made from prime starch, a chemically modified prime starch or a granular prime starch.

6. The process of claim 4 or 5 wherein the polymer composition comprises at least about 50% by weight prime starch and less than about 50% by weight of another polymer selected from the group consisting of synthetic polymers, conventional starch product, and cellulose product.

7. A polymer composition comprising: at least about 50% by weight of a prime starch and less than about 50% by weight of another polymer selected from the group consisting of a synthetic polymer, a conventional starch product, and a cellulose product.

8. The polymer composition of claim 7 wherein the prime starch is a starch graft copolymer made from prime starch, a chemically modified prime starch or a granular prime starch.

9. The process of claim 1, 2, 4 or 5 wherein said shaped article is selected from the group consisting of films, bottles, plates, containers, foamed sheets, and foamed peanuts.

10. The process of claim 1, 2, 4 or 5 wherein the prime starch is a starch graft copolymer wherein monomers are grafted onto a prime starch substrate in an amount of about 3 to about 90% by weight of starch graft copolymer.

* * * * *